United States Patent
Perez

(10) Patent No.: US 9,108,581 B2
(45) Date of Patent: Aug. 18, 2015

(54) GRILL GUARD WITH INTEGRATED LED BAR

(71) Applicant: Curt Manufacturing, LLC, Eau Claire, WI (US)

(72) Inventor: Jeff Perez, Rancho Palos Verdes, CA (US)

(73) Assignee: Curt Manufacturing, LLC, Eau Claire, WI (US)

( * ) Notice: Subject to any disclaimer, the term of this patent is extended or adjusted under 35 U.S.C. 154(b) by 0 days.

(21) Appl. No.: 14/332,499

(22) Filed: Jul. 16, 2014

(65) Prior Publication Data

US 2015/0021937 A1   Jan. 22, 2015

Related U.S. Application Data

(60) Provisional application No. 61/846,757, filed on Jul. 16, 2013.

(51) Int. Cl.
| | |
|---|---|
| *B60R 19/52* | (2006.01) |
| *B60Q 1/00* | (2006.01) |
| *B60Q 1/04* | (2006.01) |
| *B60Q 1/26* | (2006.01) |
| *B60R 19/50* | (2006.01) |

(52) U.S. Cl.
CPC ............. *B60R 19/52* (2013.01); *B60Q 1/0005* (2013.01); *B60Q 1/0035* (2013.01); *B60Q 1/0483* (2013.01); *B60Q 1/2661* (2013.01); *B60Q 1/2696* (2013.01); *B60R 2019/505* (2013.01); *B60R 2019/522* (2013.01)

(58) Field of Classification Search
CPC ................ B60R 19/52; B60R 2019/50; B60R 2019/505

See application file for complete search history.

(56) References Cited

U.S. PATENT DOCUMENTS

| | | |
|---|---|---|
| 4,469,360 A | 9/1984 | Drury |
| 4,671,552 A | 6/1987 | Anderson et al. |
| 5,326,142 A | 7/1994 | Dodds et al. |
| D361,316 S | 8/1995 | Orth, Sr. et al. |
| 6,357,707 B1 | 3/2002 | Lindsay |
| 2010/0232174 A1* | 9/2010 | Arakawa et al. ............. 362/547 |
| 2013/0293104 A1* | 11/2013 | Wu ................................ 315/77 |
| 2015/0021937 A1* | 1/2015 | Perez ............................ 293/115 |

* cited by examiner

*Primary Examiner* — Pinel Romain
(74) *Attorney, Agent, or Firm* — Shewchuk IP Services, LLC; Jeffrey D. Shewchuk

(57) ABSTRACT

A grill guard has an LED light bar positioned at a central location within the grill guard. The grill guard includes two vertically extending members and two horizontal members. The LED light bar is mounted within a casing which is integrated into the grill guard, with the LED light bar protected both by the grill guard and by the casing. The preferred mounting arrangement allows both pivoting and fore and aft movement of the LED light bar within the casing.

16 Claims, 8 Drawing Sheets

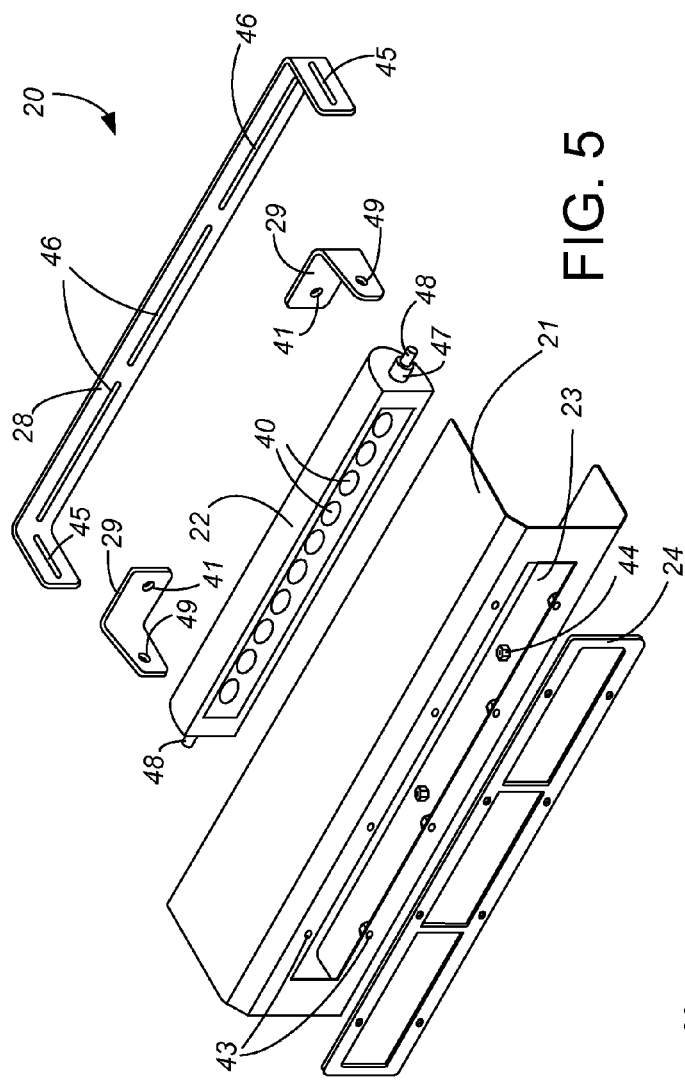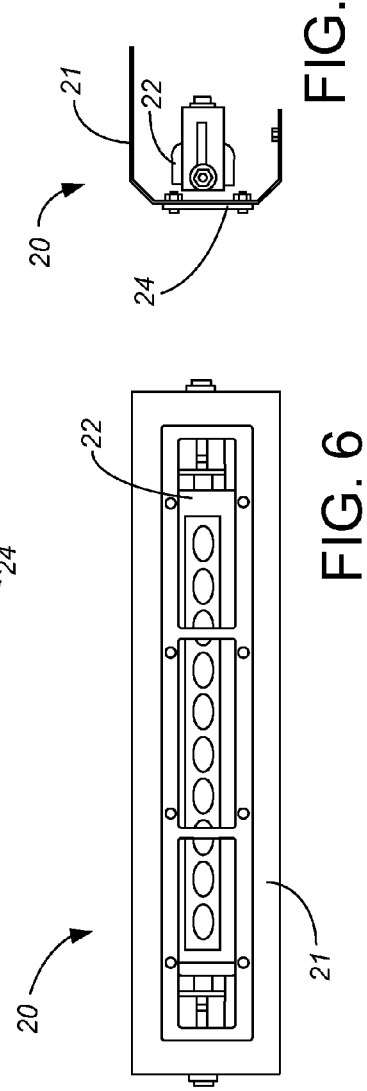

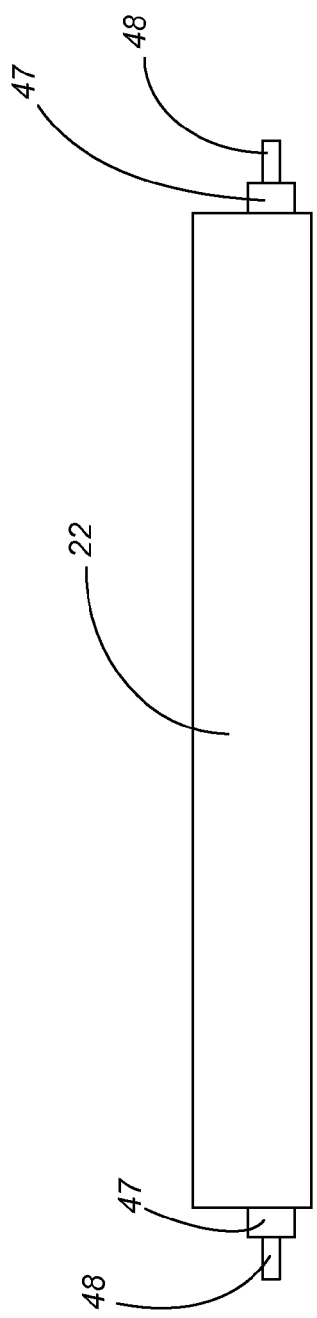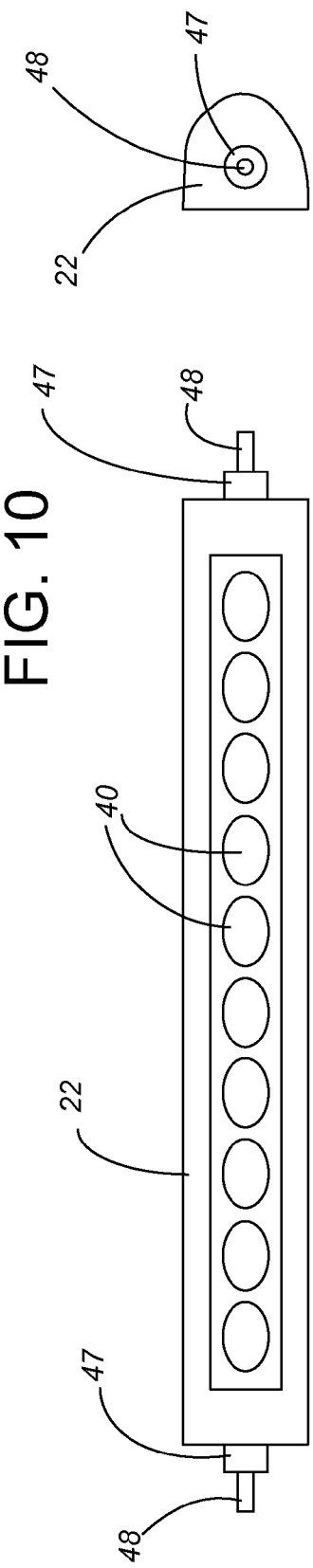
FIG. 10
FIG. 11
FIG. 12

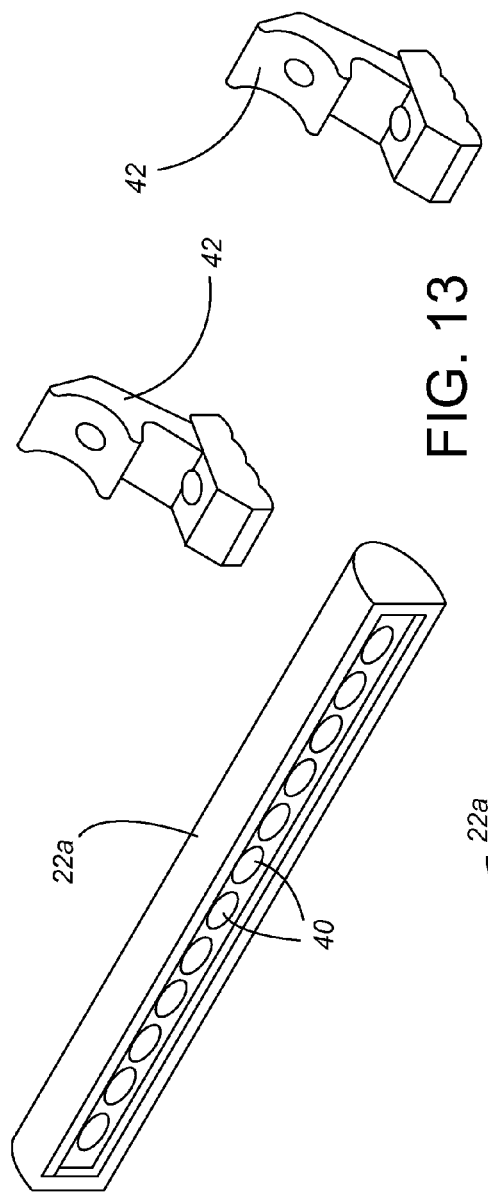
FIG. 13
FIG. 14
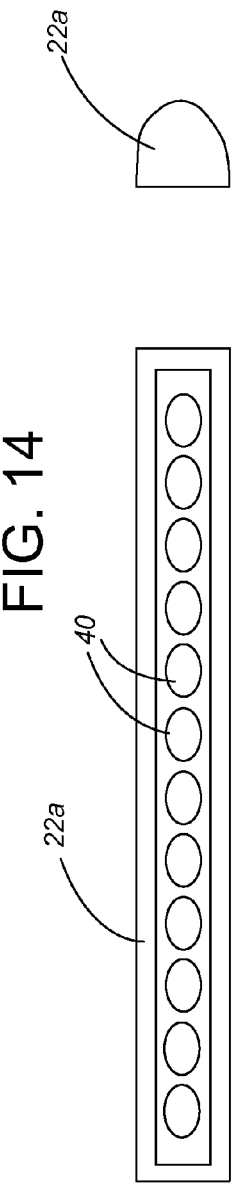
FIG. 15
FIG. 16

US 9,108,581 B2

GRILL GUARD WITH INTEGRATED LED BAR

CROSS-REFERENCE TO RELATED APPLICATION(S)

The present application claims the benefit of U.S. provisional patent application Ser. No. 61/846,757 filed Jul. 16, 2013. The contents of U.S. provisional patent application Ser. No. 61/846,757 are hereby incorporated by reference in entirety.

BACKGROUND OF THE INVENTION

The presently described invention relates generally to a grill guard assembly for attachment on the front of a vehicle. Grill guards, brush guards, push bars and bull bars (collectively referred to as "grill guards") have been on the market for the protection of the front end of vehicles such as trucks, sport utility vehicles ("SUVs"), crossover utility vehicles ("CUVs"), four-wheel drive vehicles ("4×4s"), police cars, all-terrain and other utility vehicles for many years. The grill guards presently marketed for these vehicles are generally comprised of a pair of vertical end plates arranged in parallel and located on opposite sides of the vehicle grill, with two or more transverse tubes connecting the end plates. The presently marketed grill guards are intended to protect the front grill area of the vehicle from damage from brush, small saplings and the like encountered in off-road travel. Some of the grill guards presently in use by law enforcement are meant to protect the police vehicle during aggressive maneuvers while attempting to stop suspect vehicles attempting to flee, such as during a precision immobilization technique ("PIT") maneuver or tactical ramming.

The use a grill guard creates an inherent problem associated with lighting for the vehicle. The grill guard should, to the extent possible, not interfere with light emitted by the vehicle's lighting system, while at the same time protect the lights from damage. Some of the presently marketed grill guards have extensions for the protection of the vehicle headlights. Some of the presently marketed grill guards provide mounting points for the use of external off-road lights. However, merely mounting external lights on a conventional grill guard generally leads to poorly protected external lights, or ad hoc solutions. There is a need for a new, improved, grill guard structure for effectively providing protected and flexible lighting solutions.

BRIEF SUMMARY OF THE INVENTION

The present invention is a grill guard with integrated mounting and protection of a light-emitting diode ("LED") bar, and a method of making such a grill guard. The grill guard includes two vertically extending members configured for mounting on a front of a vehicle to protect a grill of the vehicle, with at least an upper horizontal member and a lower horizontal member extending there between. An LED light bar is positioned with a casing, with the casing mounted between the two vertically extending members and at an elevation between the upper horizontal member and the lower horizontal member. The casing has a front aperture, with the LED light bar mounted horizontally so a plurality of LEDs in the LED light bar shine LED light through the front aperture.

BRIEF DESCRIPTION OF THE DRAWINGS

The foregoing aspects and the attendant advantages of the present invention will become more readily appreciated by reference to the following detailed description, when taken in conjunction with the accompanying drawings, wherein:

FIG. 5 is an exploded perspective view of the LED housing.

FIG. 6 is a front view illustrating the assembled LED housing.

FIG. 7 is a side view illustrating the assembled LED housing.

FIG. 10 is a top view of the LED light bar depicted in FIG. 5.

FIG. 11 is a front view of the LED light bar depicted in FIGS. 5 and 10.

FIG. 12 is a side view of the LED light bar depicted in FIGS. 5, 10 and 11.

FIG. 13 is a perspective view of a second embodiment of the LED light bar.

FIG. 14 is a top view of the LED light bar depicted in FIG. 13.

FIG. 15 is a front view of the LED light bar depicted in FIGS. 13 and 14.

FIG. 16 is a side view of the LED light bar depicted in FIGS. 13-15.

Figure 1:
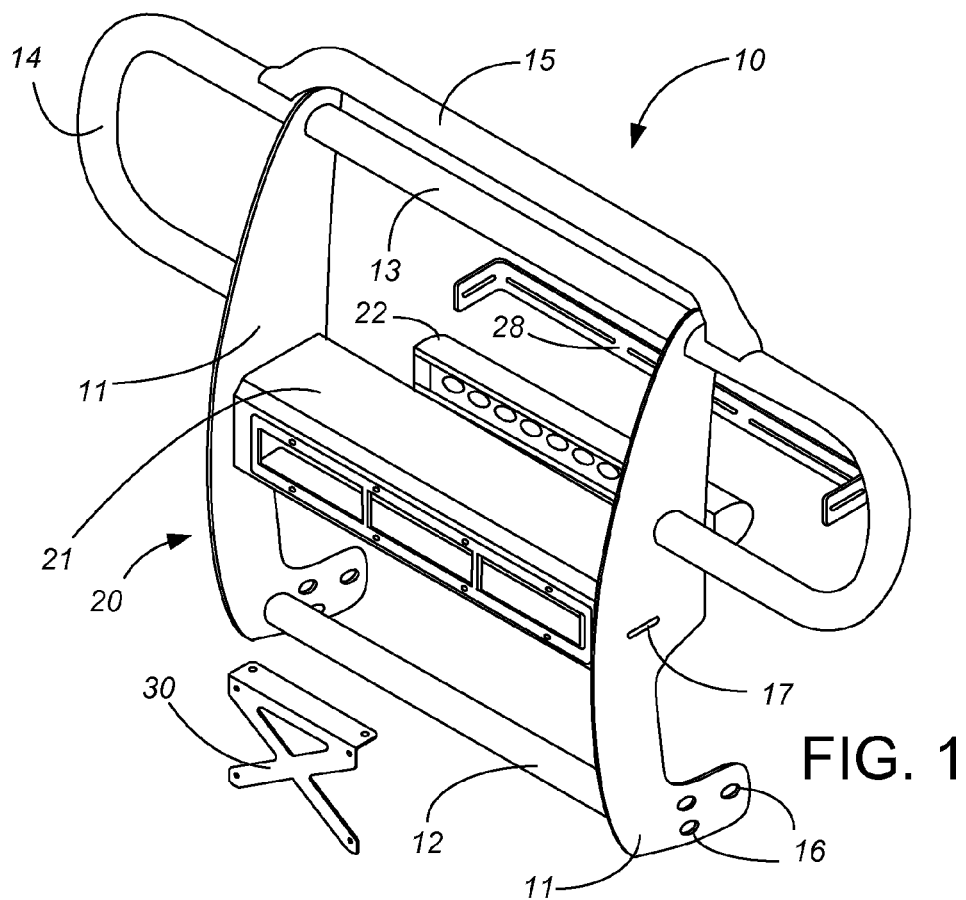
FIG. 1 is a partially-exploded perspective view of the grill guard, LED housing and license plate mounting bracket.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

As shown in FIGS. 1-4, a preferred embodiment of a grill guard 10 supports an LED Housing 20 and a license plate mounting bracket 30. The grill guard 10 has two side plates 11 of equal size and shape, extending vertically and spaced by a distance $L_1$. The plates 11 are generally positioned on the interior edge of the headlights (not shown) of the vehicle (not shown) upon which the grill guard 10 is mounted. Accordingly, the length of $L_1$ primarily depends upon the spacing of the headlights and/or mounting locations on the vehicle for which the grill guard is intended, but is typically in the range of about 2 to 6 feet. The intended vehicle will typically be a truck, SUV, CUV, 4×4, police vehicle, all-terrain vehicle or other utility vehicle. The plates 11 extend a width W1 from the front grill area at the center of each plate 11, typically in the range of 6 to 18 inches. Each plate 11 is of adequate height $H_1$ to protect the front area of a vehicle on which the grill guard 10 is mounted, i.e., roughly matching the distance from the bottom of the vehicle's bumper (not shown) to the top of the vehicle's hood (not shown). These plates 11 form the end caps the grill guard assembly. The plates 11 are shaped such that they encase the vehicle's bumper with a minimum width of $W_2$, which should be at least about two inches. In a preferred embodiment, the minimum width $W_2$ of the plates 11 is about four inches. Holes 16 at the lower section of the plates 11 are used for mounting the grill guard 10 to the vehicle. A slot 17 near the center of the plates 11 is used for the mounting (such as by nuts and bolts, not shown) and adjusting an LED light bar mounting bracket 28, described further below.

The plates 11 are joined with a plurality of tubular members, in this embodiment including a lower tubular member 12 and an upper tubular member 13. The lower tubular member 12 is preferably positioned to protect the front lower edge of the vehicle's front bumper.

A set of headlight protection tubular members 14, preferably in the shape of a sideways "U" of length $L_2$ and height $H_2$ when used with a vehicle with standard simple headlights, extend outward from the plates 11. Modifications to the shape and size of the headlight protection tubular members 14 can be made as appropriate to match the shape of the headlights (not shown) of the vehicle for which the grill guard is intended. In the preferred embodiment, the upper portion of each headlight protection tubular member 14 is positioned and attached to the plates 11 in line with the upper tubular member 13 as if they were a single piece.

Figure 3:
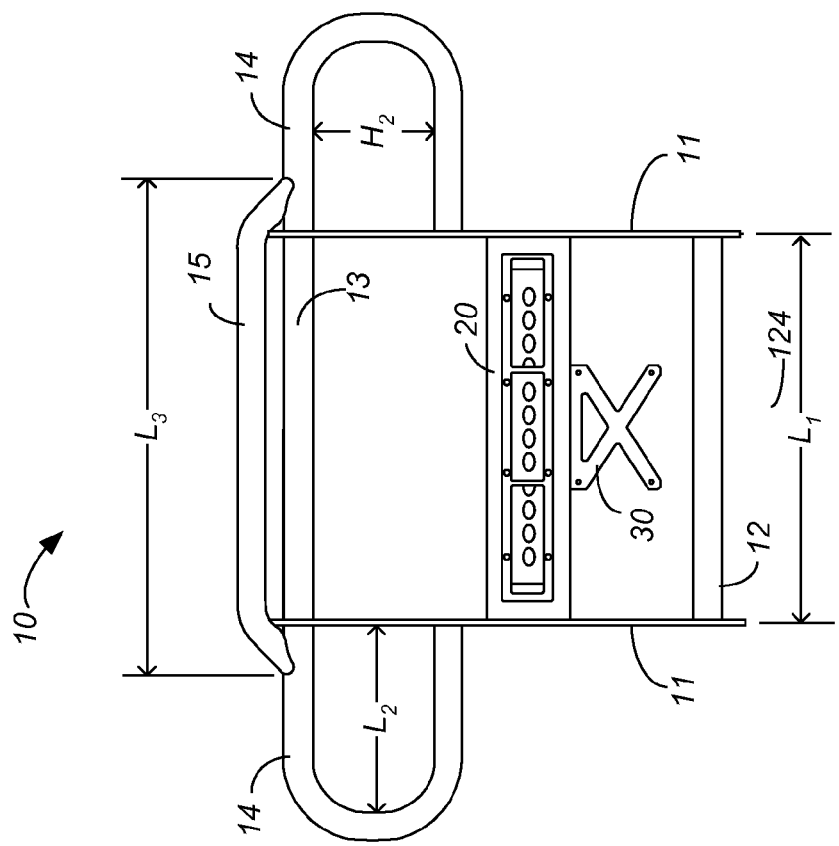
FIG. 3 is a front view illustrating the grill guard, LED housing and license plate mounting bracket.

As best shown in FIGS. 1 and 3, a preferred embodiment can have an upper-reinforcing tubular member 15 positioned directly above the upper tubular member 13. The upper-reinforcing tubular member 15 is particularly appropriate for vehicles with a high hood. The preferred upper-reinforcing tubular member 15 is of a length $L_3$ which is greater than the upper tubular member's 13 length of $L_1$, and preferably attaches on each end to each of the headlight protection tubular members 14.

For ease of construction, all of the tubular members 12, 13, 14, 15 are preferably of a similar diameter. In the preferred embodiment, this diameter is about 2½ inches, but other embodiments can use tube diameters within the range from 1 to 3 inches.

Variations can be made to the diameter of each tubular member and the number of tubular members.

The grill guard 10 is made of a material of adequate strength to protect the front grill area of the vehicle from the expected impacts which will be encountered during vehicle use. Exemplary materials include but are not limited to steel or aluminum, moulded polycarbonate and polyethylene materials. If formed of steel or aluminum, each of the tubular members 12, 13, 14 are attached on either end to the plates 11 such as by welding, and upper-reinforcing tubular member 15 is attached to headline protection tubular members 14 such as by welding.

As shown in more detail in FIGS. 5-7, the preferred LED Housing 20 has a center flange casing 21 as a primary component, with a primary purpose of protecting an LED light bar 22. The center flange casing 21 is horizontally located between the two plates 11, and vertically located between the tubular members 12 and 13, so the plates 11 and tubular members 12 and 13 also protect the LED light bar 22. In the fore and aft direction, the center flange casing 21 is located a small distance behind the front of the plates 11, such as an inch or two. The center flange casing 21 is comprised of a thin plate, with a width that fits within the plates 11. In a preferred embodiment for ease of construction, the center flange casing 21 is formed by bending sheet metal with two corners into a shape which, from a side view, is similar to a lower case "r" or "c".

As called out in FIG. 5, the center flange casing 21 has an aperture 23. Aperture 23 is preferably rectangular, to generally match the height and length of the LED light bar 22, allowing the light emanating from the LED light bar 22 to shine through.

The preferred embodiment of the center flange casing 21 has mounting points 43 for a cover plate 24. As shown in FIG. 5, a second set of mounting points 44 on the bottom of the center flange casing 21 allow for the attachment of the license plate mounting bracket 30 (shown in FIGS. 1 and 3). In a preferred embodiment, the mounting points 43, 44 include punched holes and nuts of appropriate size welded or otherwise attached to the interior edge of the center flange casing 21. The center flange casing 21 can be mounted to the grill guard 10 by various methods, such as by welding, via adhesive, or with screws or nuts and bolts.

Figure 8:
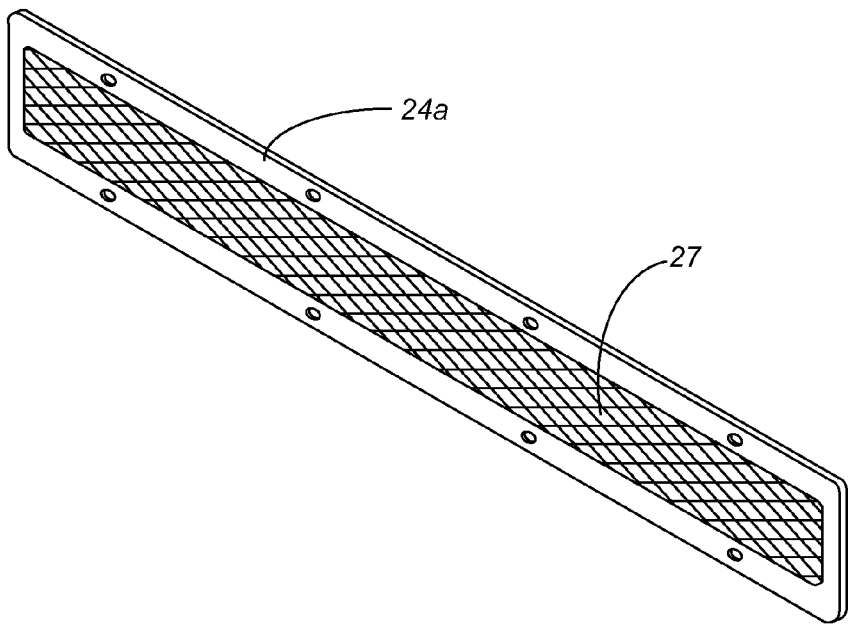
FIG. 8 is a perspective view of a second configuration of the cover plate.
Figure 9:
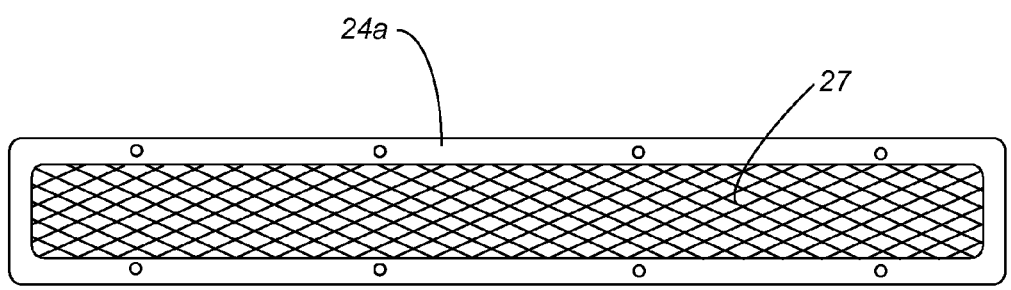
FIG. 9 is a front view of the second configuration of the cover plate.

Two exemplary configurations of a cover plate 24, 24a are shown in FIGS. 5-7 and FIGS. 8 and 9. The preferred cover plates 24, 24a are both thin rectangular plates. In FIGS. 5-7, the cover plate 24 has three apertures 26 to allow for the light of the LED light bar 22 to shine through. In FIGS. 8 and 9, the cover plate 24a has a single opening in a rectangular frame, with a mesh structure 27 attached to the inner side of the cover plate 24a. The mesh structure 27 further protects the LED light bar 22 while allowing for the light of the LED light bar 22 to shine through.

FIGS. 1, 2, 5 and 7 illustrate the preferred LED light bar mounting bracket 28. The LED light bar mounting bracket 28 is made of a thin plate in the shape of an elongated "C", with the outer edges of the LED light bar mounting bracket 28 being flush against the inner faces of the plates 11. Each side of the LED light bar mounting bracket 28 has a slot 45, which allows for attachment of the LED light bar mounting bracket 28 and the further movement of the LED light bar 22 in the fore and aft directions relative to the slots 17 in plates 11. Alternatively, end caps (not shown) can be joined to the center flange casing 21, such as in inch or two inside the plates 11, with LED light bar mounting bracket 28 attached to those end caps. The face of the LED light bar mounting bracket 28 has a series of slots 46, which allow for attachment of the LED light bar 22 with pivot brackets 29.

FIGS. 5 and 10-12 illustrate a first embodiment of the LED light bar 22. The LED light bar 22 is fastened to the LED light bar mounting bracket 28 such as through use of bushings 47 and mounting screws 48 protruding from the sides of the LED light bar 22. The LED light bar 22 houses a series of commercially available LEDs 40, such as manufactured and/or marketed by Vision X, Rigid Industries, Anzo and KC Lite-Bull Dog.

As best shown in FIG. 5, the pivot brackets 29 provide a simple and convenient way to attach the LED light bar 22 to the LED light bar mounting bracket 28. One hole 49 on each pivot bracket 29 receives extensions protruding from the LED light bar 22. A second hole 41 allows the pivot bracket 29 to be secured to the slots 46, for essentially any reasonable length of LED light bar 22.

FIGS. 13-16 illustrate a second embodiment of an LED light bar 22a. The second embodiment 22a is similar to the first embodiment 22, but includes twelve LEDs 49 rather than ten and omits the extensions 47, 48. Without the extensions 47, 48, this second embodiment of an LED light bar 22a is intended to be mounted with a different structure, such as the mounting grips 42 shown in FIG. 13. The mounting grips 42 are preferably formed of a rubberized material, which helps to minimize vibrations from reaching the LED light bar 22. An end of the mounting grip 42 curves to conform to the shape of the rear of the LED light bar 22a and attaches to the rear of the LED light bar 22a such as through the use of bolts (not shown) horizontally extending through holes in the mounting grips 42. Vertically extending holes in the mounting grips 42 can be used to secure the mounting grips 42 to the LED housing 20.

The LED light bar 22, 22a could alternatively be welded to the LED light bar mounting bracket 28. Multiple LED light bars 22 or 22a can be mounted to one or more LED light bar mounting brackets 28 utilizing any of the above described mounting configurations.

Figure 17A:
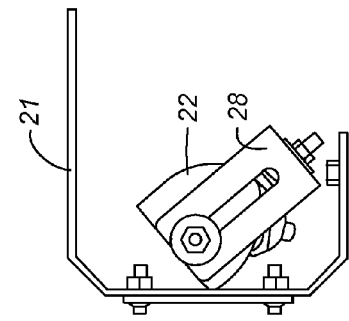
FIGS. 17a-e are side views of the LED housing, showing flexibility in positioning the LED light bar in angle and fore and aft.
Figure 17B:
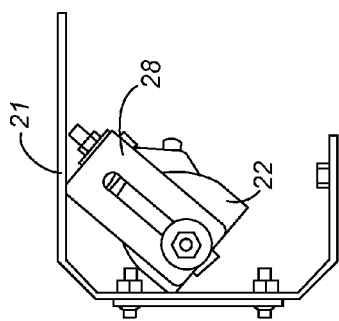
Figure 17C:
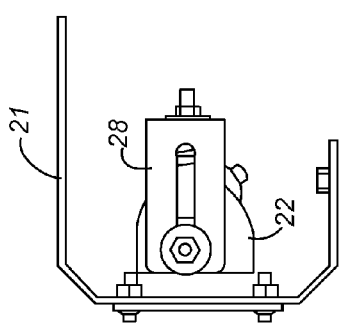
Figure 17D:
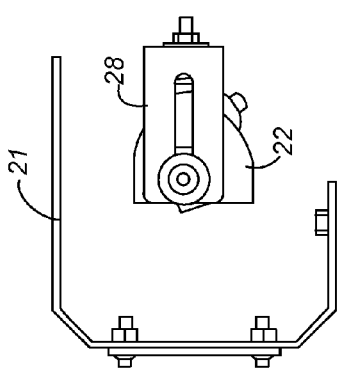
Figure 17E:
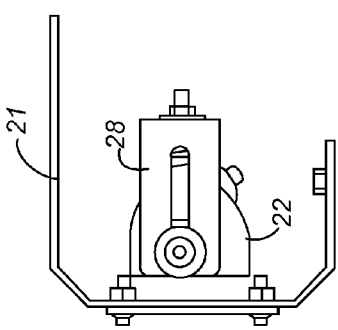

Both embodiments of the LED light bar 22 and 22a can be moved fore and aft and also be rotated. This ability to move the LED light bar 22 and 22a allows the user to project the light at a certain degree and allows for fitment of the LED light bar 22 and 22a close to the cover plate 24 and 24a. The angles of rotation of the LED light bar mounting bracket can vary. As shown in FIG. 17a, the LED light bar mounting bracket can have an initial position of a 90.0° angle relative to the top of the center flange casing 21. As shown in FIG. 17b, the LED light bar mounting bracket can rotate to a 130.0° angle relative to the top of the center flange casing. As shown in FIG. 17c, the LED light bar mounting bracket can rotate to a 50.0° angle relative to the top of the center flange casing. As shown in FIGS. 17d and 17e, the LED light bar 22 can also be adjusted forward and backward to allow for fitment, to fit towards or away from the cover plate 24, 24a. The preferred configuration permits nearly two inches of fore and aft movement as selected by the installer or user.

The center flange casing 21, the cover plate 24, 24a, and the LED light bar mounting bracket 28 comprise the LED Housing assembly 20. The LED Housing assembly 20 can be attached as a unit into the grill guard 10. The LED Housing assembly 20 can also be attached or retrofitted to any pre-existing grill guard or bull bar such as by welding, or by using any of the mounting methods described above.

Figure 2:
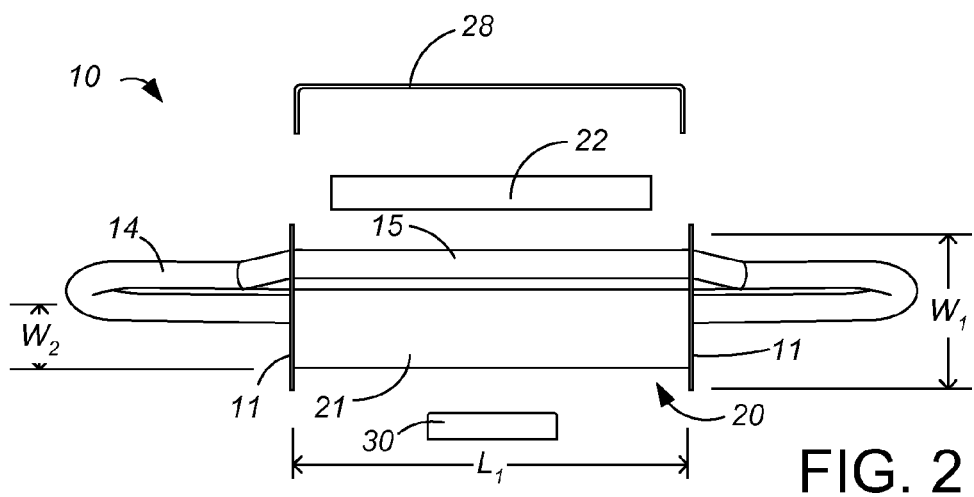
FIG. 2 is a partially-exploded top view illustrating the grill guard, LED housing and license plate mounting bracket.
Figure 4:
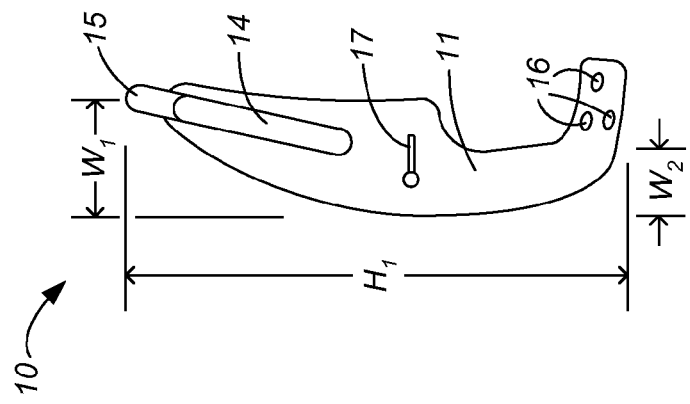
FIG. 4 is a side view illustrating the grill guard.

The optional license plate mounting bracket 30 is best shown in FIGS. 1 and 2. The preferred license plate mounting bracket 30 is in the shape of an "X" with an angled upper edge, of a length and width of a standard United States license plate. The license plate mounting bracket has holes in locations on the face of the "X" which correspond to holes of a standard United States license plate. Holes in the horizontal flange at the top of the license plate mounting bracket 30 can be used to secure the license plate mounting bracket 30 to the center flange casing 21.

Figure 18:
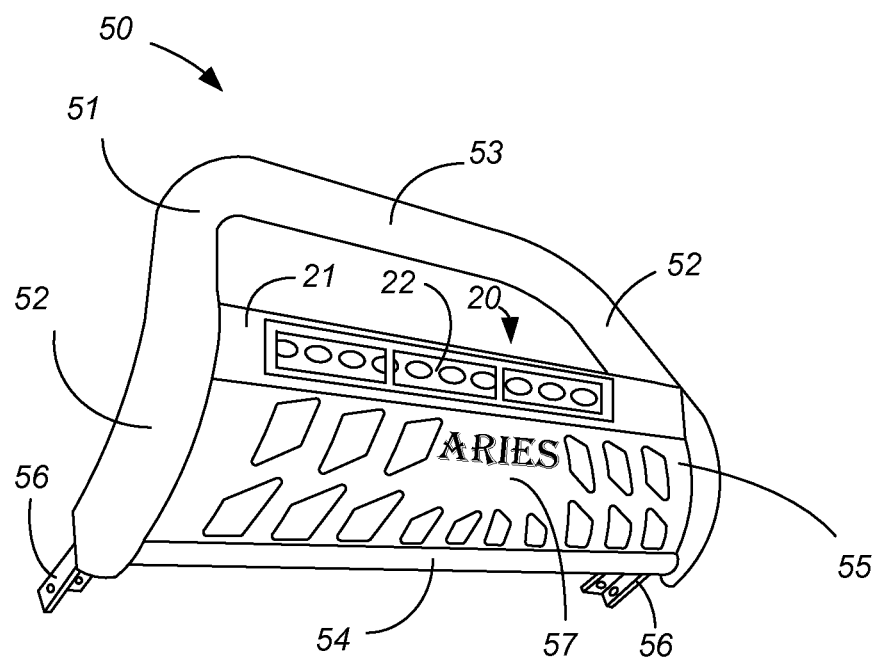
FIG. 18 is a perspective view of a bull bar incorporating the present invention.

As shown in FIG. 18, the center flange casing 21 can also be attached to a bull bar 50 or retrofitted to any existing bull bars in the market, such as by welding or fastening such as through the use of nuts and bolts. The preferred bull bar 50 primarily includes a main tubular member 51, which is bent to form both upright portions 52 and upper cross bar portion 53. The upright portions 52 extend generally vertically and form the end plates of the bull bar 50. Mounts 56 are provided at the lower ends of the upright portions 52 to secure the bull bar 50 to the frame of the vehicle. A lower cross-bar 54 is welded to the main tubular member 51. Additional cross bars (not shown) can be added. The bull bar 50 also includes a skid plate 55 which is attached or fastened (such as, but not limited to, through welding or use of nuts and bolts) to the upright portions 52 and the lower cross-bar 54. If desired, the skid plate 55 may include a section 57 for promotional information, such as a trademark of the company manufacturing and marketing the bull bar 50.

The bull bar 50 includes an LED Housing 20 integrated into the bull bar 50 between the upright portions 52 and below the upper cross-bar portion 53. The LED Housing 20 is mounted such as by attaching the center flange casing 21, or a portion or portions thereof, to the tubular member or members 51, 53. The center flange casing 21 may also be attached directly to the skid plate 55. The LED Housing 20 can be attached by welding the LED housing 20 to the upright portions 52, or through use of nuts and bolts. In a bull bar 50 as shown in FIG. 18, the center flange casing 21 is mounted at the center of the bull bar 50 above the skid plate 55.

In all the embodiments, the LED light bar is integrated directly into the grill guard/bull bar in a location that is doubly protected, once by the uprights and horizontal members and once by the casing. The LED light bar there mounted is at an ideal central position, both right to left and in elevation, for use of the LED light. The mounting arrangement provides flexibility in locating the LED light bar in the fore and aft direction, as well as in pivoting the LED light bar so the emitted light can be angled upward or downward as desired relative to the vehicle.

Although the present invention has been described with reference to preferred embodiments, workers skilled in the art will recognize that changes may be made in form and detail without departing from the spirit and scope of the invention.

The invention claimed is:

1. A grill guard comprising:
two vertically extending members configured for mounting on a front of a vehicle to protect a grill of the vehicle;
at least an upper horizontal member and a lower horizontal member extending between and rigidly joined to the vertically extending members,
a casing extending generally horizontally within the two vertically extending members and at an elevation between the upper horizontal member and the lower horizontal member, the casing having a front aperture;
a LED light bar within the casing, the LED light bar having a plurality of LEDs disposed therein for shining LED light through the front aperture.

2. The grill guard of claim 1, wherein the two vertically extending members are plate members and wherein the upper horizontal member and the lower horizontal member are tubular members.

3. The grill guard of claim 2, wherein the casing is welded to the two plate members, and wherein the upper horizontal member and the lower horizontal member are welded to the two plate members.

4. The grill guard of claim 3, wherein the casing is welded to the two plate members behind a leading edge of the two plate members, such that the front aperture of the casing is at least partially protected by the leading edge of the two plate members.

5. The grill guard of claim 4, wherein the two plate members extend in front of a front bumper with a minimum width of at least 2 inches.

6. The grill guard of claim 5, wherein the casing is welded to the two plate members at an elevation above the minimum width.

7. The grill guard of claim 1, wherein the LED light bar is mounted to allow fore and aft movement of the LED light bar to a selected fore and aft location relative to the casing within the grill guard.

8. The grill guard of claim 1, wherein the LED light bar is mounted to allow pivoting of the LED light bar to raise and lower the angle of light emitted from the LED light bar.

9. The grill guard of claim 1, further comprising a license plate holder attachable to the casing.

10. The grill guard of claim 1, wherein the grill guard further comprises headlight protection members extending to outer sides of the two vertically extending members, the headlight protection members being configured to define a space where headlights of the vehicle shine therethrough while the headlight protection members extend around and protect headlights of the vehicle.

11. The grill guard of claim 1 provided as a bull bar, wherein the two vertically extending members and the upper horizontal member are provided by a single bent tubular member.

12. The grill guard of claim 11, further comprising a skid plate between the two vertically extending members, above the lower horizontal member, and below the casing.

13. A method of fitting a grill guard with an LED light bar, comprising:
  providing a grill guard comprising:
    two vertically extending members configured for mounting on a front of a vehicle to protect a grill of the vehicle; and
    at least an upper horizontal member and a lower horizontal member extending between and rigidly joined to the vertically extending members,
  attaching a casing such that the casing extends generally horizontally within the two vertically extending members and at an elevation between the upper horizontal member and the lower horizontal member, the casing having a front aperture, the casing having an LED light bar mounted therein such that a plurality of LEDs disposed in the LED light bar can shine LED light through the front aperture.

14. The method of claim 13, wherein the attaching of the casing occurs in retrofitting an existing grill guard.

15. The method of claim 13, wherein the attaching is performed by welding the casing to the two vertically extending members.

16. The method of claim 13, wherein the two vertically extending members are plates, and wherein the casing is welded to the plates at a location behind a front edge of the plates.

* * * * *